(12) United States Patent
Brood

(10) Patent No.: US 6,507,021 B1
(45) Date of Patent: Jan. 14, 2003

(54) REFERENCE BOLOMETER AND ASSOCIATED FABRICATION METHODS

(75) Inventor: Ronald Lemuel Brood, Fullerton, CA (US)

(73) Assignee: DRS Sensors & Targeting Systems, Inc., Anaheim, CA (US)

(*) Notice: Subject to any disclaimer, the term of this patent is extended or adjusted under 35 U.S.C. 154(b) by 24 days.

(21) Appl. No.: 09/713,043

(22) Filed: Nov. 15, 2000

(51) Int. Cl.[7] .................................................. G01J 5/02
(52) U.S. Cl. ..................................................... 250/338.1
(58) Field of Search ...................................... 250/338.1

(56) References Cited

U.S. PATENT DOCUMENTS

| | | |
|---|---|---|
| 5,286,976 A | 2/1994 | Cole |
| 5,288,649 A | 2/1994 | Keenan |
| 5,300,915 A | 4/1994 | Higashi et al. |
| 5,367,167 A | 11/1994 | Keenan |
| 5,450,053 A | 9/1995 | Wood |
| 5,554,849 A | 9/1996 | Gates |
| 6,034,369 A * | 3/2000 | Oda ........................ 250/338.1 |
| 6,188,069 B1 | 2/2001 | Endoh |
| 6,211,520 B1 * | 4/2001 | Ishikawa et al. ............ 250/332 |
| 6,252,229 B1 * | 6/2001 | Hays et al. ............... 250/338.4 |
| 6,307,194 B1 * | 10/2001 | Fitzgibbons et al. ..... 250/208.1 |

FOREIGN PATENT DOCUMENTS

JP 11166863 6/1999

* cited by examiner

Primary Examiner—Constantine Hannaher
(74) Attorney, Agent, or Firm—Norris, McLaughlin & Marcus (57) ABSTRACT

A reference bolometer and the associated methods for fabricating a reference bolometer and for fabricating an array of bolometers are provided. The reference bolometer is fabricated such that a thermally conductive layer underlies the detector element, i.e., the absorber and transducer elements, and is encapsulated by a protective coating. The protective coating serves to prevent the thermally conductive layer underlying the detector element of the reference bolometer from being etched during the process of etching or otherwise removing other portions of the thermally conductive layer that underlie the detector elements of the imaging bolometers. As such, the thermally conductive layer of the reference bolometer maintains the desired thermal communication between the detector element and the substrate such that the output of the reference bolometer is unaffected by incident radiation. Methods for fabricating the reference bolometer are also provided that should increase the reliability and yield, thereby permitting manual inspection of the resulting focal plane array to be reduced.

26 Claims, 4 Drawing Sheets

REFERENCE BOLOMETER AND ASSOCIATED FABRICATION METHODS

FIELD OF THE INVENTION

The present invention relates generally to infrared detectors and associated fabrication methods and, more particularly, to a reference bolometer and an associated fabrication method.

BACKGROUND OF THE INVENTION

Infrared detectors are used in a variety of applications to provide an electrical output which is a useful measure of the incident infrared radiation. For example, quantum detectors are one type of infrared detector that are often used for night vision purposes in a variety of military, industrial and commercial applications. Quantum detectors generally operate at cryogenic temperatures and therefore require a cryogenic cooling apparatus. As a result, quantum detectors that operate at cryogenic temperatures can have a relatively complex design and generally consume significant amounts of energy.

Another type of infrared detector is a thermal detector. Thermal detectors are typically uncooled and therefore generally operate at room temperature. One type of thermal detector that has been developed and is becoming increasingly popular is a microbolometer-based, uncooled focal plane array. A focal plane array generally includes a plurality of imaging pixels, each of which includes a bolometer disposed upon a common substrate. Each bolometer includes a transducer element that has an electrical resistance that varies as a result of temperature changes produced by the incident infrared radiation. By detecting changes in the electrical resistance, a measure of the incident infrared radiation can be obtained. Since the design of a bolometer-based uncooled focal plane array is generally less complex than cryogenically cooled quantum detectors and since these uncooled focal plane arrays generally require significantly less energy than cryogenically cooled quantum detectors, bolometer-based uncooled focal plane arrays are being increasingly utilized.

Each imaging pixel of a conventional uncooled focal plane array has a bolometer that includes an absorber element for absorbing infrared radiation and an associated transducer element having an electrical resistance that varies as its temperature correspondingly varies. Although the absorber and transducer elements can be separate layers of a multilayer structure, the absorber element and transducer element may sometimes be the same physical element. In operation, infrared radiation incident upon the absorber element will heat the absorber element. Since the absorber element and transducer element are in thermal contact, the heating of the absorber element will correspondingly heat the transducer element, thereby causing the electrical resistance of the transducer element to change in a predetermined manner. By measuring the change in electrical resistance of the transducer element, such as by passing a known current through the transducer element, a measure of the incident radiation can be obtained.

In order to provide thermal contact between the absorber and transducer elements while electrically insulating the transducer element from the absorber element, the bolometer also generally includes a thermally conductive, electrically insulating layer disposed between the absorber element and transducer element. In addition, the bolometer typically includes another insulating layer disposed on the surface of the bolometer facing the substrate which serves to structurally support the other layers and to protect the other layers during the fabrication process. See, for example, U.S. Pat. Nos. 5,286,976; 5,288,649 and 5,367,167 which describe the pixel structures of conventional bolometer-based focal plane arrays, the contents of each of which are incorporated herein by reference. However, the absorber and transducer elements can be spaced apart from one another as described in U.S. Pat. No. 6,307,194, the contents of which are also incorporated herein by reference. By spacing the absorber and transducer elements, these elements can be separately optimized even though the absorber and transducer elements remain in thermal contact.

In order to provide thermal contact between the absorber and transducer elements while electrically insulating the transducer element from the absorber element, the bolometer also generally includes a thermally conductive, electrically insulating layer disposed between the absorber element and transducer element. In addition, the bolometer typically includes another insulating layer disposed on the surface of the bolometer facing the substrate which serves to structurally support the other layers and to protect the other layers during the fabrication process. See, for example, U.S. Pat. Nos. 5,286,976; 5,288,649 and 5,367,167 which describe the pixel structures of conventional bolometer-based focal plane arrays, the contents of each of which are incorporated herein by reference. However, the absorber and transducer elements can be spaced apart from one another as described in U.S. patent application Ser. No. 09/326,937, the contents of which are also incorporated herein by reference. By spacing the absorber and transducer elements, these elements can be separately optimized even though the absorber and transducer elements remain in thermal contact.

In order to further improve the performance of conventional pixel structures, each bolometer can include a reflector disposed upon the surface of the substrate underlying the absorber and transducer elements. As such, infrared radiation that is incident upon the bolometer, but that passes through and is not absorbed by the absorber element, will be reflected by the reflector back towards the absorber element. At least a portion of the reflected radiation will therefore be absorbed by the absorber element during its second pass through the absorber element, thereby increasing the percentage of the incident radiation that is absorbed by the absorber element.

In operation, infrared radiation incident upon the imaging pixel will be absorbed by the absorber element of the bolometer and the heat generated by the absorbed radiation will be transferred to the transducer element. As the transducer element heats in response to the absorbed radiation, the electrical resistance of the transducer element will change in a predetermined manner. In order to monitor the change in resistance of the transducer element and, therefore, to indirectly measure the infrared radiation incident upon the bolometer of the imaging pixel, circuitry is generally formed upon the underlying substrate. The circuitry is generally electrically connected to the transducer element via a pair of conductive paths or traces defined by or upon the legs, pillars or the like that support the absorber and transducer elements above the surface of the substrate. By passing a known current through the transducer element, the change in electrical resistance of the transducer element can be measured and a corresponding measure of the incident infrared radiation can be determined.

In addition to the imaging pixels, a bolometer-based focal plane array also generally includes one or more reference pixels. As will be described, a reference pixel is responsive, not to incident radiation, but to changes in ambient temperature and other fluctuations in the operating characteristics of the focal plane array. Based upon the output of a reference pixel, the output of the imaging pixels can be interpreted to distinguish that portion of the output that is attributable to the incident radiation upon the imaging pixel from that portion of the output that is attributable to changes in ambient temperature and other operating conditions, thereby providing a more accurate measurement of the incident radiation.

Figure 2:
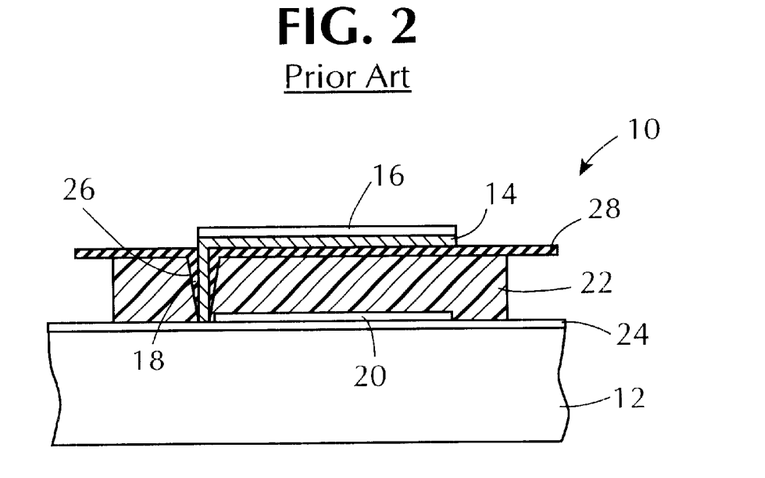
FIG. 2 is a cross-sectional side view of a conventional reference bolometer following etching of the thermally conductive layer.

A reference pixel typically has the same general construction as the imaging pixels described above. As shown in FIG. 2, a reference pixel 10 includes a bolometer formed upon the same substrate 12 as the imaging pixels. The bolometer of a reference pixel also includes a transducer element 14 and an absorber element 16 spaced from the substrate by two or more legs, pillars or the like 18. The bolometer of a reference pixel can also include a reflector 20 disposed on the substrate so as to underlie the absorber and transducer elements. Unlike the imaging pixels, however, the transducer and absorber elements are not thermally isolated from the substrate. Instead, the transducer and absorber elements are thermally coupled to the underlying substrate such that any heat generated by the incident radiation or by electrical current flowing through the reference pixel is transferred to the substrate and, in some instances, to a heat sink or the like upon which the substrate is mounted. By extracting the heat, changes in the electrical resistance of the transducer element of the bolometer of a reference pixel will be due, not to the incident radiation or to electrical current flowing through the reference pixel, but to changes in the ambient temperature. Hence the output provided by the bolometer of a reference pixel is attributable to changes in the ambient temperature and other operating conditions.

In order to thermally couple the absorber and transducer elements 16,14 with the underlying substrate 12, the bolometer of a reference pixel 10 generally includes a thermally conductive heat sink layer 22. The thermally conductive heat sink layer is disposed between and in thermal contact with both the absorber and transducer elements and the underlying substrate. As such, any heat generated by radiation incident upon the absorber and transducer elements or by electrical current flowing therethrough is transferred via the thermally conductive heat sink layer to the substrate. Generally, the thermally conductive heat sink layer is formed of a polyimide that, as described below, also serves as a release layer that supports the absorber and transducer elements of the bolometers of the imaging pixels during the fabrication process, but that is subsequently removed to complete the fabrication process thereof in order to thermally decouple the absorber and transducer elements of the bolometers of the imaging pixels from the substrate.

In this regard, the conventional technique for fabricating a bolometer-based focal plane array that includes a plurality of imaging pixels and at least one reference pixel generally begins with the provision of a suitable substrate 12. As known to those skilled in the art, the substrate is typically comprised of silicon and includes a plurality of integrated circuits and the associated circuitry for providing signals to and processing signals that are received from the respective pixels. A passivation layer 24, such as a layer of silicon dioxide ($SiO_2$) or the like, is deposited upon the substrate. Thereafter, the exposed surface of the passivation layer is subjected to chemical and mechanical polishing in order to planerize the exposed surface. Following the deposition and planerization of the passivation layer, the reflectors 20 can be deposited upon the passivation layer. Typically, the reflectors are deposited in locations upon the passivation layer that correspond to the eventual locations of the respective bolometers. Thereafter, a release layer 22 of polyimide is deposited. The polyimide layer and the underlying passivation layer are then etched to define openings 26 to the substrate. Thereafter, the absorber and transducer elements 16,14 as well as any insulating layers are deposited upon the polyimide layer at locations that correspond to the positions of the respective bolometers. As such, each pair of absorber and transducer elements overlie a reflector to form a respective bolometer. Along with the deposition of the absorber and transducer elements, legs, pillars or other supports 18 are typically formed within the openings defined through the polyimide layer and the underlying passivation layer in order to connect the absorber and transducer elements with the substrate. In addition to providing mechanical support for the absorber and transducer elements, electrical leads are typically defined along or through the legs, pillars or other supports to interconnect the transducer element and the circuitry carried by the substrate.

In order to complete the fabrication of the bolometer-based focal plane array, the polyimide layer that is disposed between the reflector and the absorber and transducer elements of the bolometers of the imaging pixels is removed in order to thermally decouple the absorber and transducer elements from the underlying substrate. As such, the polyimide layer can be etched, typically by a plasma etching process. During this etching process, all of the polyimide layer associated with the imaging pixels is etched. Absent preventative measures, the polyimide layer 22 that is disposed between the reflector and the absorber and transducer elements 16,14 of each reference pixels 10 would also be etched. Since the polyimide layer provides the thermal path from the absorber and transducer elements to the substrate 12 that is necessary to prevent the output of the reference bolometer from including contributions due to the incident radiation, however, the polyimide layer of the reference pixel must underlie the entire surface area of the absorber and transducer elements to provide sufficient heat sinking for the heat generated by the incident radiation.

Figure 1:
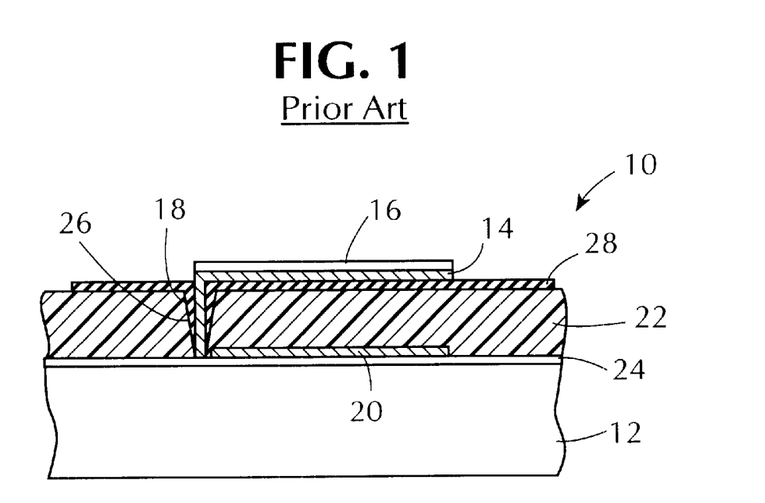
FIG. 1 is a cross-sectional side view of a conventional reference bolometer during an intermediate stage of fabrication prior to the etching of the thermally conductive layer.

In order to prevent the etching of the polyimide layer 22 from undercutting the absorber and transducer elements 16,14 of the reference pixel 10, the bolometer of a reference pixel also preferably includes an oxide layer 28 disposed upon the polyimide layer and underlying the absorber and transducer elements as shown in FIG. 1. The oxide layer, typically formed of $SiO_2$ or another oxide, is generally insensitive to the etching. As such, the oxide layer protects the portion of the polyimide layer that underlies the absorber and transducer elements from etching. In this regard, upon exposure to the etchant, the etchant begins to undercut and etch away those portions of the polyimide layer that underlie the absorber and transducer elements of the imaging pixels at the same time and at the same rate that the etchant begins to undercut and remove the polyimide layer that underlies the oxide layer associated with each reference pixel. By sizing the oxide layer such that the oxide layer has a sufficiently large footprint in comparison to the absorber and transducer elements of the reference pixel, the polyimide layer that underlies the absorber and transducer elements of the imaging pixels will be completely removed prior to removing any of the polyimide layer that underlies the absorber and transducer elements of the reference pixels. Upon completion of the etching process, the outer portions of the oxide layer extend in a cantilevered fashion outwardly from the underlying polyimide layer due to the undercutting and the removal of the portion of the polyimide layer that previously supported the outer portions of the oxide layer. See FIG. 2.

While the oxide layer 28 offers some protection for that portion of the polyimide layer 22 that underlies the absorber and transducer elements 16,14 of the reference pixels 10, the fabrication process is generally not sufficiently robust for producing large quantities of bolometer-based focal plane arrays in an automated fashion. In this regard, it is generally desirable to somewhat over etch the polyimide layer to insure that all traces of that portion of the polyimide layer that previously supported the absorber and transducer elements of the imaging pixels has been removed, thereby insuring that the absorber and transducer elements of the imaging pixels are thermally decoupled from the underlying substrate. In the process of over etching the portion of the polyimide layer associated with the imaging pixels, however, that portion of the polyimide layer that underlies the absorber and transducer elements of the reference pixels may also be at least somewhat etched or undercut. As a result of any such indercutting, the reference pixel will be less sensitive and, if the undercutting is substantial, may fail since the absorber and transducer elements of the reference pixel will not be sufficiently thermally coupled to the underlying substrate 12. The oxide layer 28 that is disposed between the polyimide layer and the absorber and transducer elements of a reference pixel can be enlarged to further protect the polyimide layer associated with the reference pixel. However, the enlargement of the oxide layer can reduce the density with which the reference pixels can be fabricated. Since a bolometer-based focal plane array is desirably quite dense, further enlargement of the oxide layer is therefore disadvantageous.

Additionally, it has been observed that the plasma etching process may proceed more rapidly in the vicinity of certain features. For example, plasma etching may occur more rapidly along the edges of conductor patterns or leads as a result of radio frequency (RF) antenna effects or the like. As such, that portion of the polyimide layer 22 that underlies the absorber and transducer elements 16,14 of a reference pixel 10 may be etched undercut in those regions proximate a conductor or lead, even if the oxide layer 28 is otherwise large enough to prevent more conventional undercutting. As described above, this undercutting the polyimide layer that otherwise underlies the absorber and transducer elements of a reference pixel reduces the thermal coupling between the absorber and transducer elements and the underlying substrate 12 and correspondingly decreases the sensitivity of the reference pixel.

As shown in FIG. 2, the cantilevered portion of the oxide layer 28 that extends beyond the polyimide layer 22 of a reference pixel 10 following etching of other portions of the polyimide layer is quite thin and fragile and is therefore prone to being fractured or broken. Fragments of the oxide layer that have been broken can then move about the vacuum chamber in which the bolometer-based focal plane array is disposed and may distort the measurements or images obtained by the focal plane array. In this regard, the fragments of the oxide layer may come to rest upon the absorber and transducer elements of an imaging pixel. Although small, these fragments would increase the thermal mass of the absorber and transducer elements and may shield the absorber and transducer elements from a certain portion of the incident radiation, thereby disadvantageously altering the output otherwise provided by the imaging pixel.

As a result of the problems associated with overetching of the polyimide layer and fracturing of the oxide layer, bolometer-based focal plane arrays must generally be manually inspected prior to being placed in service. As will be apparent this manual inspection process is quite time consuming and increases the cost of the resulting focal plane array. Thus, it would be advantageous to reliably fabricate bolometer-based focal plane arrays so as to have a higher yield and thereby permit the manual inspection of the focal plane arrays to be reduced, if not eliminated. For example, it would be desirable to fabricate a bolometer-based focal plane array in such a manner that the portion of the polyimide layer underlying the absorber and transducer elements of the imaging pixels could be fully removed without undercutting or otherwise etching that portion of the polyimide layer that underlies the absorber and transducer elements of a reference pixel. In addition, it would be desirable to fabricate a bolometer-based focal plane array having more rugged reference pixels that no longer include a thin, cantilevered oxide layer that is prone to breakage which, in turn, creates fragments that can distort the resulting measurements obtained by the bolometer-based focal plane array. Further, it would be desirable to fabricate a bolometer-based focal plane array without restricting the density with which the pixels can be formed.

SUMMARY OF THE INVENTION

These and other shortcomings of conventional focal plane arrays are addressed by the reference bolometer and the associated methods for fabricating a reference bolometer and for fabricating an array of bolometers according to the present invention. Preferably, the reference bolometer is fabricated such that a thermally conductive layer underlies the detector element, i.e., the absorber and transducer elements, and is encapsulated by a protective coating. The protective coating serves to prevent the thermally conductive layer underlying the detector element of the reference bolometer from being etched during the process of etching or otherwise removing other portions of the thermally conductive layer that underlie the detector elements of the imaging bolometers. As such, the thermally conductive layer of the reference bolometer of the present invention maintains the desired thermal communication between the detector element and the substrate such that the output of the reference bolometer is unaffected by incident radiation. As described below, the methods for fabricating the reference bolometer according to the present invention are robust and should increase the reliability and yield compared to conventional fabrication processes, thereby permitting manual inspection of the resulting focal plane array to be reduced, if desired. communication between the detector element and the substrate such that the output of the reference bolometer is uneffected by incident radiation. As described below, the methods for fabricating the reference bolometer according to the present invention are robust and should increase the reliability and yield compared to conventional fabrication processes, thereby permitting manual inspection of the resulting focal plane array to be reduced, if desired.

The reference bolometer of the present invention includes a thermally conductive layer disposed on a portion of a substrate. The thermally conductive layer includes a first surface opposite the substrate and a side surface extending between the first surface and the substrate. The reference bolometer also includes a protective coating on at least the side surface of the thermally conductive layer and, more typically, on both the first surface and the side surface of the thermally conductive layer. As described below in conjunction with the method for fabricating the reference bolometer, the protective coating serves to prevent that portion of the thermally conductive layer that underlies the detector element of the reference bolometer from being etched or otherwise removed during the removal of those portions of the thermally conductive layer that underlie the detector elements of imaging bolometers of the focal plane array. The reference bolometer further includes a detector element, typically including the absorber and transducer elements, disposed on the first surface of the thermally conductive layer. As such, the detector element is in thermal communication with the substrate via the thermally conductive layer. In this regard, the thermally conductive layer preferably defines a footprint on the substrate that is at least as large as the detector element such that the thermally conductive layer underlies all portions of the detector element.

The reference bolometer of some embodiments also includes an etch stop layer disposed on a portion of the substrate surrounding the thermally conductive layer. As also described below in conjunction with the fabrication methods of the present invention, the etch stop layer facilitates the fabrication of the reference bolometer and, more particularly, the definition of the protective coating. Further, the reference bolometer can include a reflector disposed upon that portion of the substrate underlying the thermally conductive layer or the detector element.

According to one aspect of the present invention, a method of fabricating a reference bolometer is provided. According to this method, a thermally conductive layer is initially formed on a portion of the substrate. The thermally conductive layer is formed to have a first surface opposite the substrate and a side surface extending between the first surface and the substrate. A protective coating is then deposited on at least the side surface of the thermally conductive layer and, more typically, on both the first surface and the side surface of the thermally conductive layer. A detector element, typically comprised of the absorber and transducer elements, is then constructed on the first surface of the thermally conductive layer such that the conductive layer is in thermal communication with the substrate via the thermally conductive layer.

According to one embodiment, the thermally conductive layer is formed by uniformly depositing a thermally conductive layer on the substrate and thereafter removing the thermally conductive layer from selected portions of the substrate. In this regard, the thermally conductive layer is removed from selected portions of the substrate, such as those portions of the substrate that support the imaging pixels, to define a thermally conductive island associated with each reference pixel. More particularly, the thermally conductive layer is preferably removed from an annular portion of the substrate to thereby define a moat surrounding the thermally conductive island. Thereafter, the protective coating can be deposited and the detector element can be constructed upon the thermally conductive island to form a reference bolometer.

According to one embodiment, an etch stop layer is also deposited on a portion of the substrate that surrounds the thermally conductive layer, i.e., within the moat surrounding the thermally conductive island, prior to depositing the protective coating. In this regard, a reflector is also typically deposited on the substrate contemporaneously with the deposition of the etch stop layer and prior to forming the thermally conductive layer. Following the fabrication of the remainder of reference bolometer, the reflector will underlie the detector element and will be spaced therefrom by the thermally conductive layer. In embodiments in which an etch stop layer is deposited on the portion of the substrate that surrounds the thermally conductive layer, the protective coating is then deposited on both the thermally conductive layer and the etch stop layer. Subsequently, that portion of the protective coating that has been deposited upon the etch stop layer is removed, while that portion of the protective coating that has been deposited on the thermally conductive layer is preserved. As such, the protective coating preferably encapsulates both the first surface and the side surface of the thermally conductive layer. Thereafter, the detector element can be constructed on a portion of the protective coating that is deposited on the first surface of the thermally conductive layer.

In order to fabricate an array of bolometers according to one aspect of the present invention, a plurality of imaging bolometers and at least one reference bolometer are constructed with the reference bolometer constructed as described above. During an intermediate stage of the fabrication process, however, each imaging bolometer also includes the thermally conductive layer and a respective detector element disposed on the thermally conductive layer. According to this aspect of the present invention, the exposed portions of the thermally conductive layer are then etched, thereby removing the thermally conductive layer underlying the detector element of each imaging bolometer. As a result of the protective layer that encapsulates the portion of the thermally conductive layer that underlies the detector element of the reference bolometer, however, the thermally conductive layer of the reference bolometer is not etched and, instead, continues to thermally couple the detector element and the underlying substrate.

The fabrication processes of the present invention therefore provide a robust technique for reliably manufacturing a focal plane array in which the thermally conductive layer is completely removed from each imaging bolometer while the thermally conductive layer remains intact for each reference bolometer. As such, the reference bolometers will be thermally coupled to the substrate in a reliable fashion without a concern for undercutting and without having to deposit a relatively large oxide layer that could decrease the density with which the bolometers could otherwise be spaced. Moreover, the resulting reference bolometer will no longer include an oxide layer that extends outwardly in a cantilevered fashion, thereby reducing the possibility that the oxide layer might fracture into fragments that may disadvantageously impair the measurements or image captured by the focal plane array. By fabricating the focal plane array in a more reliable fashion, the yield should be greater than conventional fabrication processes and the bolometers will no longer have to be visually inspected to the same degree as conventional bolometers, thereby decreasing the time required for fabrication and the corresponding fabrication cost.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 3:
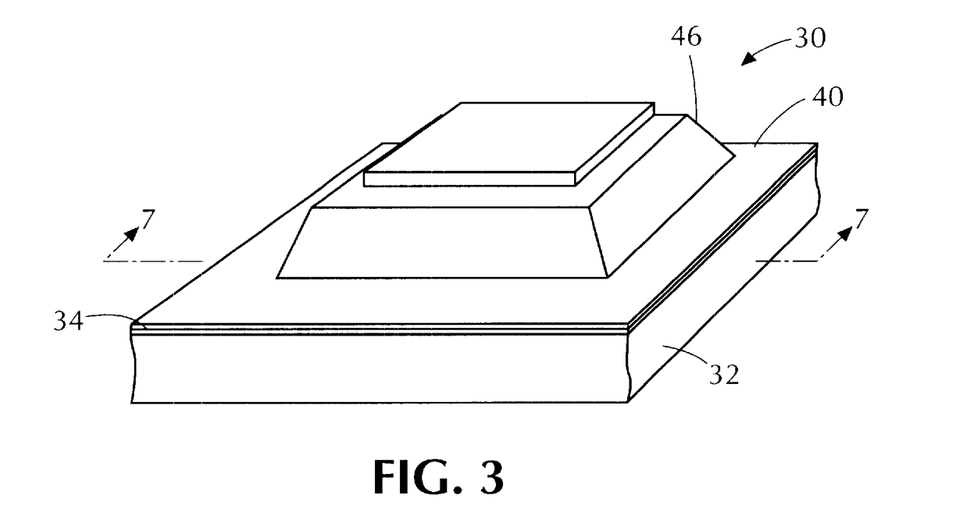
FIG. 3 is a perspective view of a reference bolometer according to one embodiment of the present invention.

Referring now to FIG. 3, a reference pixel 30 according to one advantageous embodiment of the present invention is illustrated. As known to those skilled in the art, a focal plane array typically includes one or more reference pixels and an array of imaging pixels, thereby forming an uncooled infrared focal plane array. Although the array can have different sizes, such as 320 rows by 240 columns, the focal plane array of one common example includes an array of imaging pixels arranged in 640 rows and 480 columns, with a respective reference pixel associated with each row and with each column.

Although not illustrated, the focal plane array is typically disposed within a housing that is sealed to establish a vacuum chamber. The housing typically includes a window formed of a material that is transparent to infrared radiation such that infrared radiation incident upon the housing can be sensed by one or more pixel structures of the focal plane array. See, for example, U.S. Pat. No. 6,252,229 that describes housings and techniques for sealing the housings in which focal plane arrays are disposed, the contents of which are incorporated herein by reference.

A focal plane array is built upon a substrate 32. The substrate is preferably a microelectronic substrate and, as such, is typically formed of silicon although other materials can be utilized. Circuitry, such as CMOS circuitry, is typically formed on or below the surface of the substrate in a manner known to those skilled in the art in order to provide signals to and process signals that are received from the respective pixels. For example, the circuitry associated with a focal plane array that has an array of imaging pixels preferably includes row and column select elements for permitting individual ones of the imaging and reference pixels to be addressed. As known to those skilled in the art, the circuitry can also include other circuitry disposed upon the substrate in electrical communication with the row and/or column select elements for processing the signals transmitted to or received from the respective pixels.

With respect to the imaging pixels, the circuitry permits each imaging pixel to be interrogated to determine the radiation incident thereupon. With respect to the reference pixels 30, the circuitry permits each reference pixel to be similarly interrogated to determine changes in the ambient temperature and other operating conditions. By appropriately modifying the output provided by the imaging pixels based upon the output of the corresponding reference pixels, the effect of changes in the ambient temperature and other operating conditions can be removed from the output of the imaging pixels, thereby providing a more accurate measurement of the infrared radiation incident thereupon. Typically, a reference pixel is associated with each column and with each row of the array so that the output of a respective imaging pixel is adjusted based upon the corresponding outputs of the reference pixels for the same row and column as the respective imaging pixel.

In order to fabricate a reference bolometer, a passivation layer 34 is typically deposited upon the substrate 32 in order to protect the circuitry and to provide a planar surface upon which the reference bolometer is subsequently constructed. Typically, the passivation layer is formed of an oxide, such as $SiO_2$, although other materials can be utilized. The surface of the passivation layer opposite the substrate is typically polished, such as by chemical mechanical polishing, in order to planerize the surface.

The reference bolometer includes a reflector 36 disposed upon the passivation layer 34 in a location underlying at least a portion of the absorber 38, as described hereinafter. For example, after the passivation layer has been formed upon the substrate 32, a layer of metal is patterned on the exposed surface of the passivation layer to be the reflector. This layer defines the bottom side of the optical cavity for absorption. The top side of the cavity will, in turn, be defined by the absorber layer which is formed later in the fabrication process and will be described hereinafter. The reflector may be formed from a variety of materials, including aluminum in one advantageous embodiment.

Figure 4:
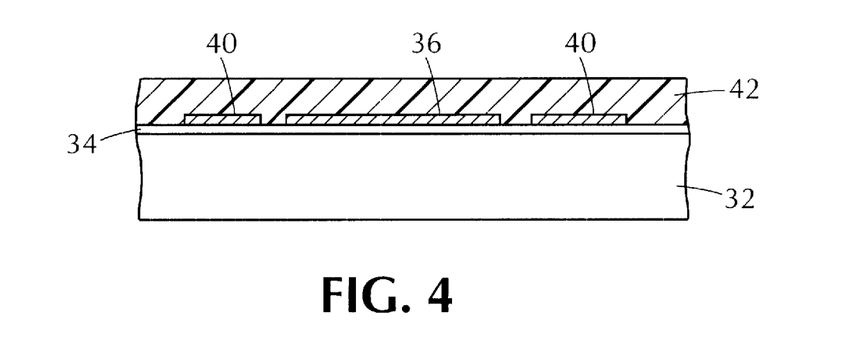
FIG. 4 is a cross-sectional side view of a partially fabricated reference bolometer according to one embodiment of the present invention following the deposition of the thermally conductive layer.

Concurrent with the deposition of the metal to form the reflector 36, an etch stop layer 40 is preferably formed so as to surround the reference bolometer. As depicted in FIGS. 3 and 4 and described in more detail hereinafter, the etch stop layer generally has an annular shape and is spaced somewhat from the reflector. As will be apparent during the subsequent description of an advantageous fabrication technique, the etch stop layer serves to protect the passivation layer 34 and, in turn, the underlying substrate 32 and associated circuitry from etchant during the removal of the various layers that are built upon the etch stop layer. Particularly, the etch stop layer is also formed of a metal, such as aluminum, although other materials can be utilized.

Unlike an imaging bolometer, the reference bolometer includes a thermally conductive layer 42, disposed upon the reflector 36 at a location that also underlies the detector element, i.e., the absorber 38 and transducer 44, as described hereinafter. In this regard, the thermally conductive layer preferably underlies the entire surface area of the absorber and transducer and substantially fills the space between the absorber and transducer and the underlying substrate 32 in order to facilitate the thermal coupling of the absorber and transducer with the underlying substrate and, in some embodiments, with a heat sink or the like upon which the substrate is mounted. As such, heat generated in the absorber and transducer due to incident radiation can be transferred to the substrate, thereby preventing the electrical resistivity of the transducer from being altered in response to incident radiation. Although the thermally conductive layer can be formed of a variety of thermally conductive materials, the thermally conductive layer is preferably formed of a material, such as a polyimide, that can also be etched, such as by plasma etching or the like. As such, the thermally conductive layer can be selectively removed from the imaging bolometers such that the absorber and transducer of the imaging bolometers are released and thermally isolated from the underlying substrate. As such, the thermally conductive layer is also known as a release layer.

Figure 5:
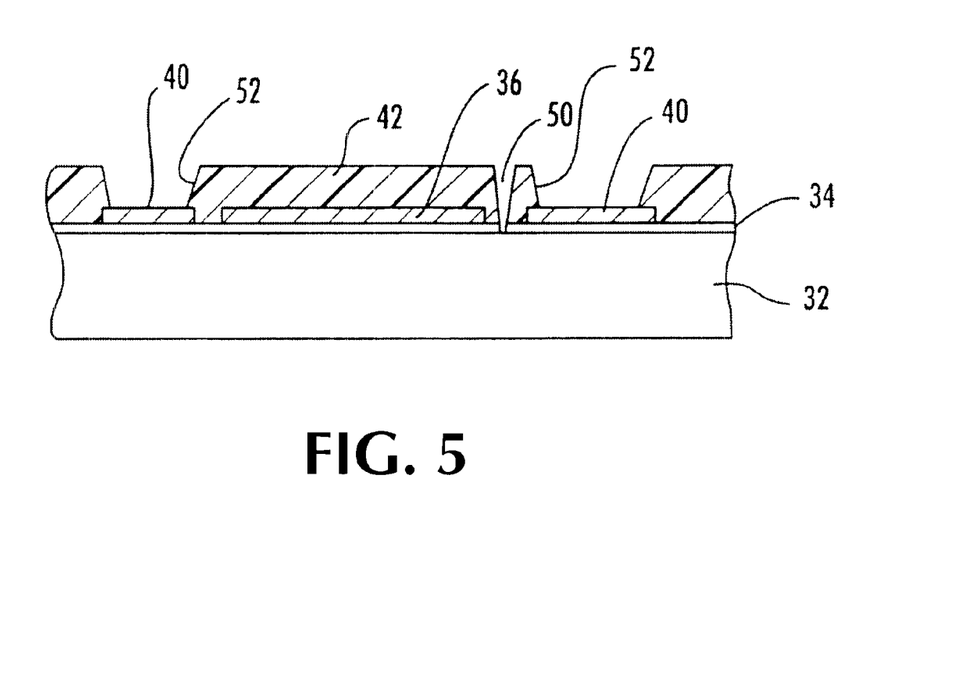
FIG. 5 is a cross-sectional side view of a partially fabricated reference bolometer according to one embodiment of the present invention following the patterning of the thermally conductive layer to define a thermally conductive island surrounded by a moat.
Figure 6:
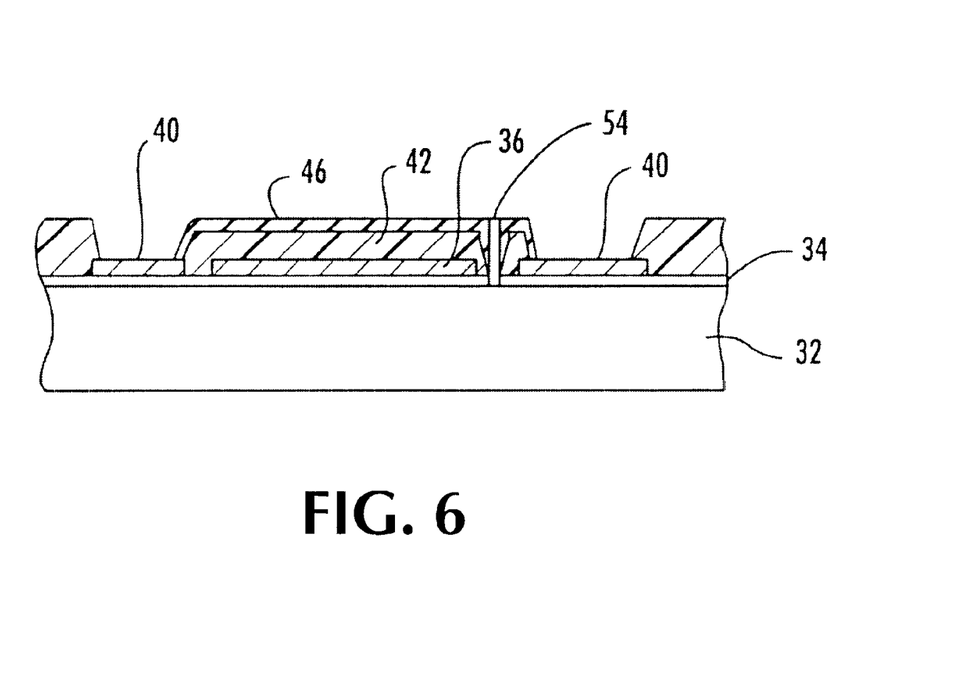
FIG. 6 is a cross-sectional side view of a partially fabricated reference bolometer according to one embodiment of the present invention following the deposition of the protective layer to encapsulate the thermally conductive island.

According to the present invention, the reference bolometer also includes a protective coating 46 that preferably encapsulates the thermally conductive layer 42 and prevents the thermally conductive layer of the reference bolometer from being etched or otherwise removed during the fabrication of the focal plane array. In this regard, that portion of the thermally conductive layer associated with the imaging bolometers can be etched or otherwise removed without correspondingly etching or removing the thermally conductive layer of the reference bolometer. As shown in FIGS. 5 and 6 and described in more detail hereinafter, the thermally conductive layer generally includes a first surface opposite the substrate and side surface that extends between the first surface and the substrate 32 and/or the passivation layer 34. Since the absorber 38 and transducer 44 will generally cover most, if not all, of the first surface of the thermally conductive layer, the protective coating generally covers the side surface and any portion of the first surface that has not been covered by the absorber and transducer such that the combination of the absorber and transducer and the protective layer effectively encapsulates the thermally conductive layer of the reference bolometer. In some embodiments, however, the protective coating covers the side surface and the entire first surface such that the absorber and transducer are, in turn, formed upon that portion of the protective coating that covers the first surface. The protective layer can be formed of a variety of materials that are resistant to the etchant that will be utilized to remove the remainder of the thermally conductive layer, i.e., those portions of the thermally conductive layer underlying the absorber and transducer of the imaging bolometers. In one embodiment, however, the protective layer is an oxide and, more particularly, $SiO_2$ which protects the thermally conductive layer of the reference bolometer from plasma etching.

Figure 7:
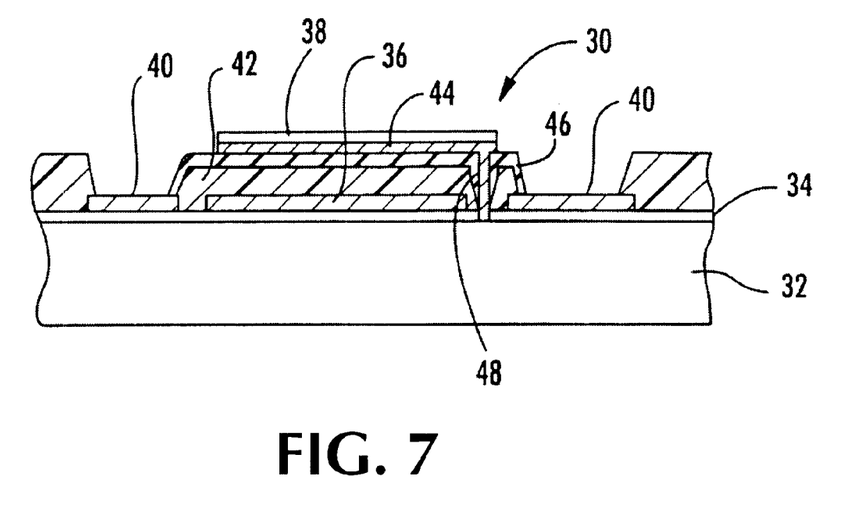
FIG. 7 cross-sectional side view of the reference bolometer of FIG. 3 taken along line 7—7.

As shown in FIG. 7, the reference bolometer also includes a transducer 44 disposed on the thermally conductive layer 42 and, in those embodiments in which the first surface of the thermally conductive layer is also encapsulated by the protective coating 46, the transducer is disposed upon that portion of the protective coating that covers the first surface of the thermally conductive layer. The transducer is formed of a material having an electrical resistance that varies in response to changes in its temperature. For example, the transducer of one advantageous embodiment is formed of vanadium oxide $VO_x$ since vanadium oxide has an electrical resistance that predictably varies in a significant manner in response to changes in its temperature.

The reference bolometer also includes an absorber 38. As is shown in FIG. 7, the absorber may be disposed on the transducer 44 such that radiation absorbed by the absorber heats both the absorber and transducer, thereby causing the electrical resistance of the transducer to correspondingly vary. Alternatively, the absorber can be spaced from, but in thermal contact with the transducer 14 as described in co-pending U.S. Pat. No. 6,307,194, the contents of which are incorporated herein by reference. The absorber is preferably formed of a material that is strongly absorptive of radiation of the wavelength range of interest, such as infrared radiation (IR) having a wavelength of 8 to 14 microns. In addition, the absorber is preferably formed of a material that is relatively lightweight, stiff and electrically inactive. As such, the absorber of one advantageous embodiment is formed of silicon nitride. However, the absorber can be formed of other materials without departing from the spirit and scope of the present invention. For purposes of description, the transducer and the absorber will collectively be referenced hereinafter as the detector element.

In order to support the detector element above the substrate 32, the reference bolometer also preferably includes two or more legs, pillars or other supports 48 extending between the substrate and the detector element. In one embodiment, the detector element is supported by pillars that extend outwardly in an orthogonal manner from the substrate so as to support the transducer 44 above the substrate. The pillars typically provide both mechanical support and electrical connection for the detector element with the circuitry carried by the substrate. For example, each pillar can be a composite structure formed of an electrically conductive material, such as chromium or nichrome, extending through an electrically insulating material, such as $SiO_2$ or the like, in order to provide electrical contact between the transducer and circuitry disposed upon the substrate, as described in more detail below.

In operation, radiation, such as IR radiation having a wavelength of 8 to 14 microns, that is incident upon the absorber 38 causes the temperature of the absorber to increase. This increased temperature is transmitted to the transducer 44 since the absorber and transducer are in thermal contact. In an imaging bolometer, the temperature of the transducer would increase and the electrical resistance of the transducer would be correspondingly altered. As a result of the thermal coupling between the detector element and the substrate 32 via the thermally conductive layer 42 of a reference bolometer, however, the heat and any increase in the temperature created by the incident radiation, for example, is transferred or dumped to the substrate and, in some embodiments, to an underlying heat sink or the like.

The temperature of the transducer 44 of the reference bolometer will increase, however, with changes in the ambient temperature since these changes also correspondingly alter the temperature of the thermally conductive layer 42 and the underlying substrate 32. Like an imaging bolometer, current can then be passed through the transducer via the circuitry disposed upon the substrate and the conductive portions of the pillars 48. In a typical embodiment of a focal plane array, a known voltage can be applied across the transducer to induce current to flow through the transducer. By measuring the changes in the electrical resistance of the transducer, the circuitry on the substrate or other associated processing elements can determine the change in the ambient temperature and other operating conditions. By correspondingly measuring the changes in the electrical resistance of the transducers of the associated imaging bolometers, such as the imaging bolometers in the same row or column as the reference bolometer, the current propagating through the transducers of the imaging bolometers can be adjusted to compensate for or be offset by those changes in the current attributable to changes in the ambient temperature and other operating conditions. As such, the adjusted current will be reflective of the radiation incident upon the respective imaging bolometers and will not be offset by changes attributable to fluctuations in the ambient temperature and other operating conditions. By analyzing the radiation incident upon each of an array of imaging bolometers, a two-dimensional image of the incident radiation can be constructed that is appropriately modified to compensate for temperature fluctuations.

As shown in FIGS. 4–7, the reference pixel 30 of the present invention is typically fabricated by a unique series of conventional microelectronic fabrication steps. In this regard, a substrate 32 having circuitry formed thereon is provided. A passivation layer 34 is then deposited upon the substrate and the surface of the passivation layer opposite the substrate is generally planerized, such as by chemical mechanical polishing. A reflector 36 is then formed by depositing a layer of reflective material, such as aluminum, upon the passivation layer. Concurrent with the formation of the reflector, an etch stop layer 40 is preferably deposited to protect the underlying passivation layer and the substrate during a subsequent etching process as will be described. While the etch stop layer can be formed of various materials that are etch resistant, the etch stop layer is typically formed of the same material, such as aluminum, as the reflector and can be formed during the same deposition process as a reflector, thereby allowing an additional structure, namely, the etch stop layer, to be defined without adding an additional processing step.

A thermally conductive layer 42 is then deposited as shown in FIG. 4. Typically, the thermally conductive layer is formed of a material that is not only thermally conductive, but is capable of being etched such that the thermally conductive layer can also serve as a release layer for supporting the detector elements of the imaging bolometers during fabrication while being susceptible of being readily etched or otherwise removed in order to thermally decouple the detector elements of the imaging bolometers from the substrate 32. In one embodiment, for example, the thermally conductive layer is formed of a polyimide. While the thermally conductive layer can have various thicknesses depending upon the design of the bolometers, the thermally conductive layer of one embodiment has a thickness of about one micron which, in turn, defines the gap or spacing between the substrate and the detector element of an imaging bolometer.

After lithographically patterning the thermally conductive layer 42, the thermally conductive layer is etched to define at least one and, more typically, a pair of openings 50 through which the substrate 32 is exposed such that electrical contact can subsequently be made with the circuitry carried by the substrate. See FIG. 5, for example, in which a single opening is depicted. In addition, an annular opening 52 is typically defined in the thermally conductive layer that surrounds the reference bolometer to thereby define a moat. As also shown in FIG. 5, this annular opening is aligned with the etch stop layer 40 such that the opening extends through the thermally conductive layer but terminates at the etch stop layer and does not extend into the passivation layer 34 and/or the substrate. As a result of the annular opening, the partially fabricated reference bolometer now includes an island of the thermally conductive material. As will be appreciated by those skilled in the art, the annular opening can be defined so as to have various widths depending upon a number of factors including the resolution of the lithographic process and the like. Moreover, while the annular opening has been described and illustrated to extend around a single reference bolometer, the annular opening may extend around a plurality or chain of reference bolometers such that each bolometer in the chain remains upon the same island of thermally conductive material.

After removing the photoresist that defines the pattern of the openings through the thermally conductive layer 42, a protective coating 46 is deposited. Typically, the protective coating is formed of an insulating material that is resistant to the etchant that will be utilized to remove those portions of the thermally conductive layer associated with the imaging bolometers. In one embodiment, for example, the protective layer is an oxide layer, such as $SiO_2$ or the like. The protective layer is generally deposited within the openings and across the exposed surface of the thermally conductive layer. The protective layer can be deposited in various fashions, such as by sputtering, but is typically deposited by plasma enhanced chemical vapor deposition (PECVD).

The protective coating 46 is then lithographically patterned to define the desired shape. With respect to the reference bolometer of the present invention, the protective coating covers at least the side surface of the thermally conductive layer 42 and, more preferably, encapsulates both the side surface and the first surface of the thermally conductive layer. By lithographically patterning the protective coating, openings 54 are also preferably defined through the material that has been deposited within the openings that extend to the substrate 32 such that the substrate and, more particularly, circuitry on the substrate is again exposed, as shown in FIG. 6.

The transducer 44 is then deposited upon the first surface of the thermally conductive layer 42 and, more typically, upon that portion of the protective layer 46 that is disposed upon the first surface of the thermally conductive layer. After photographically patterning the transducer element, electrically conductive material, such as chromium or nichrome, is deposited, such as by sputtering, in the openings 54 defined through the oxide layer to the underlying substrate 32. See, for example, FIG. 7. As such, electrical contact can be established between the transducer and the circuitry disposed upon the substrate. Thereafter, the absorber 38 can be deposited upon the transducer and lithographically patterned to have the desired shape. By way of example, silicone nitride can be deposited by sputtering to form the absorber. Although not described or illustrated herein, the detector element comprised of the transducer and the absorber can also include one or more insulating layers as known to those skilled in the art.

Typically, the reference bolometer of the present invention is formed concurrent with a plurality of imaging bolometers to define a focal plane array. In this regard, the thermally conductive layer 42 preferably supports the detector elements of the imaging bolometers during the fabrication process. That portion of the thermally conductive layer underlying the detector elements of the imaging bolometers is then etched, such as by oxygen plasma etching. In order to insure that the thermally conductive layer is completely removed from the imaging bolometers so as to prevent undesired thermal coupling between the detector elements and the underlying substrate 32, the thermally conductive layer is typically somewhat overetched. As a result of the encapsulation of the thermally conductive layer of the reference bolometers by the protective coating 46, however, the thermally conductive layer of the reference bolometer is not etched and remains intact.

Figure 8:
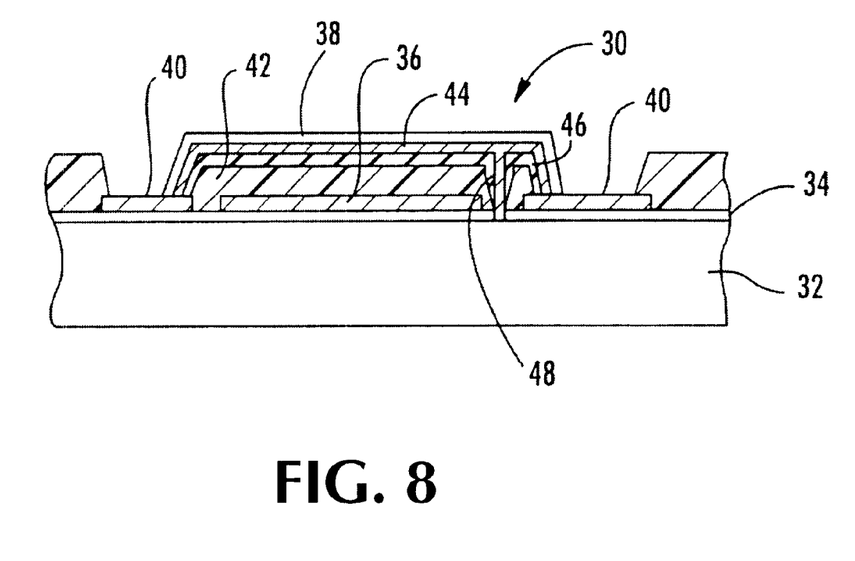
FIG. 8 is a cross-sectional side view of a reference bolometer in which the detector element is also disposed upon at least a portion of the side surface of the thermally conductive layer according to another embodiment of the present invention.

While the protective coating 46 is generally effective for protecting the thermally conductive layer 42 from etching, the additional layers deposited upon the conductive layer, such as the absorber 38 and the transducer 44, may be sized so as to be deposited upon and coat all or at least a portion of the side surface of the thermally conductive layer as well as the edge between the side surface and the first surface of the thermally conductive layer. See FIG. 8. By depositing these additional layers upon the side surface of the thermally conductive layer, the thermally conductive layer could be further protected during the process of etching of the thermally conductive layer from the imaging bolometers, particularly in instances in which the protective coating is somewhat imperfect and may have openings through which plasma gas could otherwise reach the thermally conductive layer. Additionally, the deposition of these additional layers upon the side surface of the thermally conductive layer may also increase the heatsink efficiency of the reference bolometer and may serve as a light stop for extraneous light that might otherwise enter from the edges of the thermally conductive layer. As used herein, the protective coating shall therefore include not only a coating of oxide or the like that is distinct from the absorber and the transducer, but also any additional layers, such as the absorber, the transducer or the like, that is deposited upon the side surface of the thermally conductive layer, irrespective of whether the side surface is also coated with an oxide or any other purely protective layer.

In contrast to conventional reference bolometers, the overetching of the thermally conductive layer 42 associated with the imaging bolometers therefore does not cause undercutting of the thermally conductive layer that supports the detector elements of the reference bolometers. In addition, the thermally conductive layer of the reference bolometers is protected from accelerated etching along conductors, leads or the like that extend through or under the thermally conductive layer since the thermally conductive layer is encapsulated by the protective coating 46. Thus, the footprint of the thermally conductive layer of the reference bolometer will remain at least as large as the overlying detector element such that the detector element and the underlying substrate 32 will be reliably thermally coupled. The fabrication processes of the present invention therefore provide a robust technique for reliably manufacturing a focal plane array in which the thermally conductive layer is completely removed from each imaging bolometer while remaining intact for each reference bolometer. As such, the reference bolometers will be thermally coupled to the substrate in a reliable fashion without concern for undercutting and without having to deposit a relatively large oxide layer 28 that could decrease the density with which the bolometers could otherwise be spaced. Moreover, the resulting reference bolometer will no longer include an oxide layer that extends outwardly in a cantilevered fashion, thereby reducing the possibility that the oxide layer might fracture into fragments that may disadvantageously impair the measurements or image captured by the focal plane array. By fabricating the focal plane array in a more reliable fashion, the yield should be greater than conventional fabrication processes and the bolometers will no longer have to be visually inspected to the same degree as conventional bolometers, thereby decreasing the time required for fabrication and the corresponding fabrication costs.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A reference bolometer disposed upon a substrate, the reference bolometer comprising:

a thermally conductive layer disposed over a portion of the substrate, said thermally conductive layer comprising a first surface opposite the substrate and a side surface extending between the first surface and the substrate;

a protective coating over at least the side surface of said thermally conductive layer; and a detector element disposed over the first surface of said thermally conductive layer and at least a portion of said protective coating that is over the side surface of said thermally conductive layer such that said detector element is in thermal communication with the substrate via said thermally conductive layer.

2. A reference bolometer according to claim 1 further comprising an etch stop layer disposed over a portion of the substrate surrounding said thermally conductive layer.

3. A reference bolometer according to claim 1 wherein said protective coating encapsulates both the first surface and the side surface of said thermally conductive layer.

4. A reference bolometer according to claim 3 wherein said detector element is disposed over that portion of said protective coating that covers the first surface of said thermally conductive layer.

5. A reference bolometer according to claim 1 further comprising a reflector disposed over the substrate and underlying at least one of said thermally conductive layer and said detector element.

6. A reference bolometer according to claim 1 wherein said thermally conductive layer defines a footprint over the substrate that is at least as large as said detector element such that the thermally conductive layer underlies all portions of said detector element.

7. A reference bolometer disposed upon a substrate, the reference bolometer comprising:

a thermally conductive layer disposed over a portion of the substrate, said thermally conductive layer comprising a first surface opposite the substrate and a side surface extending between the first surface and the substrate; and a detector element disposed over both the first surface and at least a portion of the side surface of said thermally conductive layer such that said detector element is in thermal communication with the substrate via said thermally conductive layer.

8. A reference bolometer according to claim 7 wherein said detector element comprises an absorber.

9. A reference bolometer according to claim 7 wherein said detector element comprises a transducer.

10. A reference bolometer according to claim 7 further comprising an etch stop layer disposed over a portion of the substrate surrounding said thermally conductive layer.

11. A reference bolometer according to claim 7 further comprising a reflector disposed over the substrate underlying at least one of said thermally conductive layer and said detector element.

12. A reference bolometer according to claim 7 wherein said thermally conductive layer defines a footprint over the substrate that is at least as large as said detector element such that the thermally conductive layer underlies all portions of said detector element.

13. A method of fabricating a reference bolometer comprising:

forming a thermally conductive layer over a portion of a substrate, wherein the thermally conductive layer is formed to have a first surface opposite the substrate and a side surface extending between the first surface and the substrate;

depositing a protective coating over at least the side surface of the thermally conductive layer; and constructing a detector element over the first surface and at least a portion of the side surface of the thermally conductive layer such that the detector element is in thermal communication with the substrate via the thermally conductive layer.

14. A method according to claim 13 wherein forming the thermally conductive layer over a portion of the substrate comprises:

depositing the thermally conductive layer over the substrate; and removing the thermally conductive layer from selected portions of the substrate to thereby define a thermally conductive island upon which the protective coating is deposited and the detector element is constructed.

15. A method according to claim 14 wherein removing the thermally conductive layer from selected portions of the substrate comprises removing the thermally conductive layer from an annular portion over the substrate to thereby define a moat surrounding the thermally conductive island.

16. A method according to claim 13 further comprising depositing an etch stop layer over a portion of the substrate that surrounds the thermally conductive layer prior to depositing the protective coating.

17. A method according to claim 16 further comprising depositing a reflector over a portion of the substrate contemporaneously with the deposition of the etch stop layer and prior to forming the thermally conductive layer such that the reflector will subsequently underlie the detector element and will be spaced therefrom by the thermally conductive layer.

18. A method according to claim 16 wherein depositing the protective coating comprises:

depositing the protective coating over both the thermally conductive layer and the etch stop layer; and removing the protective coating deposited over the etch stop layer while preserving the protective coating deposited over the thermally conductive layer such that the protective coating encapsulates both the first surface and the side surface of the thermally conductive layer.

19. A method according to claim 18 wherein constructing the detector element comprises constructing the detector element over the protective coating that is deposited over the first surface of the thermally conductive layer.

20. A method of fabricating an array of bolometers comprising at least one reference bolometer and a plurality of imaging bolometers, the method comprising:

constructing at least one reference bolometer comprising a thermally conductive layer, a detector element disposed over the thermally conductive layer, wherein the detector element and a protective coating are disposed over at least a side surface of the thermally conductive layer;

constructing a plurality of imaging bolometers, each imaging bolometer comprising the thermally conductive layer and a respective detector element disposed over the thermally conductive layer; and etching exposed portions of the thermally conductive layer to thereby remove the thermally conductive layer underlying the detector element of each imaging bolometer, wherein at least the protective coating prevents etching of the thermally conductive layer underlying the detector element of the reference bolometer.

21. A method according to claim 20 wherein constructing the at least one reference bolometer and the plurality of imaging bolometers comprises:

depositing the thermally conductive layer over a substrate; and removing the thermally conductive layer from selected portions over the substrate to thereby define a thermally conductive island for supporting the detector element of the at least one reference bolometer.

22. A method according to claim 21 wherein removing the thermally conductive layer from selected portions over the substrate comprises removing the thermally conductive layer from an annular portion over the substrate to thereby define a moat surrounding the thermally conductive island.

23. A method according to claim 20 wherein constructing the at least one reference bolometer comprises depositing an etch stop layer over a portion of a substrate that surrounds the thermally conductive layer prior to depositing the protective coating.

24. A method according to claim 23 wherein constructing the plurality of imaging bolometers comprises depositing a plurality of reflectors over respective portions of the substrate contemporaneously with the deposition of the etch stop layer and prior to forming the thermally conductive layer such that each reflector will subsequently underlie the detector element of a respective imaging bolometer.

25. A method according to claim 23 wherein constructing the at least one reference bolometer comprises:

depositing the protective coating over both the thermally conductive layer and the etch stop layer; and removing the protective coating deposited over the etch stop layer while preserving the protective coating deposited over the thermally conductive layer of the reference bolometer such that the protective coating encapsulates both the first surface and the side surface of the thermally conductive layer.

26. A method according to claim 20 wherein etching exposed portions of the thermally conductive layer comprises plasma etching exposed portions of the thermally conductive layer.

* * * * *

UNITED STATES PATENT AND TRADEMARK OFFICE
CERTIFICATE OF CORRECTION

PATENT NO. : 6,507,021 B1
DATED : January 14, 2003
INVENTOR(S) : Ronald Lemuel Brood It is certified that error appears in the above-identified patent and that said Letters Patent is hereby corrected as shown below:

Column 1,
Line 61, enter as a new paragraph:

-- In order to permit the imaging pixels to be responsive to changes in the incident infrared radiation, the bolometer is generally designed to minimize thermal loss to the substrate. Thus, the bolometers of the imaging pixels have separated the absorber and transducer elements from the substrate so as to substantially thermally decouple the relatively massive substrate from the pixel. In this regard, each bolometer generally includes two or more legs that support the absorber and transducer elements above the substrate. The legs can extend between the absorber and transducer elements and the substrate, or the legs can connect the absorber and transducer elements to pillars or the like that support the absorber and transducer elments above the substrate. --

Column 2,
Cancel lines 14-33.

Column 6,
Cancel lines 49-56, starting with "communication".

Signed and Sealed this

Twenty-first Day of October, 2003

JAMES E. ROGAN
*Director of the United States Patent and Trademark Office*